United States Patent [19]
Lorenz

[11] Patent Number: 5,866,637
[45] Date of Patent: Feb. 2, 1999

[54] MAGNETIC THERMAL TRANSFER RIBBON WITH NON-METALLIC MAGNETS

[75] Inventor: Michael A. Lorenz, Miamisburg, Ohio

[73] Assignee: NCR Corporation, Dayton, Ohio

[21] Appl. No.: 681,543

[22] Filed: Jul. 23, 1996

[51] Int. Cl.$^6$ .............................. C09D 11/12; C08K 5/00; C08K 5/16
[52] U.S. Cl. ......................... 523/161; 524/176; 524/204; 524/208; 524/277; 106/31.29; 106/31.32; 430/37
[58] Field of Search ...................... 524/277, 176, 524/204, 208; 523/161; 106/31.29, 31.32; 430/37

[56] References Cited

U.S. PATENT DOCUMENTS

| | | |
|---|---|---|
| 3,663,278 | 5/1972 | Blose et al. . |
| 4,311,775 | 1/1982 | Regan .......................................... 430/37 |
| 4,315,643 | 2/1982 | Tokunaga et al. . |
| 4,391,893 | 7/1983 | Hendriks ................................. 430/137 |
| 4,403,224 | 9/1983 | Wirnowski . |
| 4,463,034 | 7/1984 | Tokunaga et al. . |
| 4,628,000 | 12/1986 | Talvalkar et al. . |
| 4,687,701 | 8/1987 | Knirsch et al. . |
| 4,698,268 | 10/1987 | Ueyama . |
| 4,707,395 | 11/1987 | Ueyama et al. . |
| 4,777,079 | 10/1988 | Nagamoto et al. . |
| 4,923,749 | 5/1990 | Talvalkar . |
| 4,983,446 | 1/1991 | Taniguchi et al. . |
| 4,988,563 | 1/1991 | Wehr . |
| 5,041,331 | 8/1991 | Glavin et al. . |
| 5,126,390 | 6/1992 | Duff ........................................ 524/276 |
| 5,128,308 | 7/1992 | Talvalkar . |
| 5,240,781 | 8/1993 | Obata et al. . |
| 5,248,652 | 9/1993 | Talvalkar . |
| 5,348,348 | 9/1994 | Hanada et al. . |
| 5,506,079 | 4/1996 | Grigoryan et al. ...................... 430/110 |

FOREIGN PATENT DOCUMENTS

55/17811   2/1980   Japan .

OTHER PUBLICATIONS

"Designer Magnets", *Chemical & Engineering News*, pp. 30–41, Oct. 2, 1995.

*Primary Examiner*—Andrew E. C. Merriam
*Attorney, Agent, or Firm*—Richard J. Traverso

[57] ABSTRACT

There is provided by the present invention coating formulations and thermal transfer media that form printed images which are readable by magnetic ink character recognition (MICR) devices. These formulations and ribbons employ wax, binder resin and an organic molecule-based magnet. MICR readable printed images obtained therefrom are also provided as is a thermal printer which employs the ribbon.

5 Claims, 1 Drawing Sheet

MAGNETIC THERMAL TRANSFER RIBBON WITH NON-METALLIC MAGNETS

FIELD OF THE INVENTION

The present invention relates to thermal transfer printing wherein images are formed on a receiving substrate by heating extremely precise areas of a print ribbon with thin film resistors. This heating of the localized area causes transfer of ink or other sensible material from the ribbon to the receiving substrate. The sensible material is typically a pigment or dye which can be detected optically or magnetically.

More particularly, the present invention is directed to thermal transfer ink formulations and to thermal transfer media obtained therefrom which provide characters that are readable by magnetic ink character recognition (MICR) devices through the use of organic molecule-based magnets.

BACKGROUND OF THE INVENTION

Thermal transfer printing has displaced impact printing in many applications due to advantages such as the relatively low noise levels which are attained during the printing operation. Thermal transfer printing is widely used in special applications such as in the printing of machine readable bar codes and magnetic alpha-numeric characters. The thermal transfer process provides great flexibility in generating images and allows for broad variations in style, size and color of the printed image. Representative documentation in the area of thermal transfer formulations and thermal transfer media used in thermal transfer printing includes the following patents.

U.S. Pat. No. 3,663,278, issued to J. H. Blose et al. on May 16, 1972, discloses a thermal transfer medium having a coating composition of cellulosic polymer, thermoplastic resin, plasticizer and a "sensible" material such as a dye or pigment.

U.S. Pat. No. 4,315,643, issued to Y. Tokunaga et al. on Feb. 16, 1982, discloses a thermal transfer element comprising a foundation, a color developing layer and a hot melt ink layer. The ink layer includes heat conductive material and a solid wax as a binder material.

U.S. Pat. No. 4,403,224, issued to R. C. Winowski on Sep. 6, 1983, discloses a surface recording layer comprising a resin binder, a pigment dispersed in the binder, and a smudge inhibitor incorporated into and dispersed throughout the surface recording layer, or applied to the surface recording layer as a separate coating.

U.S. Pat. No. 4,463,034, issued to Y. Tokunaga et al. on Jul. 31, 1984, discloses a heat-sensitive magnetic transfer element having a hot melt or a solvent coating.

U.S. Pat. No. 4,628,000, issued to S. G. Talvalkar et al. on Dec. 9, 1986, discloses a thermal transfer formulation that includes an adhesive-plasticizer or sucrose benzoate transfer agent and a coloring material or pigment.

U.S. Pat. No. 4,687,701, issued to K. Knirsch et al. on Aug. 18, 1987, discloses a heat sensitive inked element using a blend of thermoplastic resins and waxes.

U.S. Pat. No. 4,698,268, issued to S. Ueyama on Oct. 6, 1987, discloses a heat resistant substrate and a heat-sensitive transferring ink layer. An overcoat layer may be formed on the ink layer.

U.S. Pat. No. 4,707,395, issued to S. Ueyama et al., on Nov. 17, 1987, discloses a substrate, a heat-sensitive releasing layer, a coloring agent layer, and a heat-sensitive cohesive layer.

U.S. Pat. No. 4,777,079, issued to M. Nagamoto et al. on Oct. 11, 1988, discloses an image transfer type thermosensitive recording medium using thermosoftening resins and a coloring agent.

U.S. Pat. No. 4,923,749, issued to Talvalkar on May 8, 1990, discloses a thermal transfer ribbon which comprises two layers, a thermal sensitive layer and a protective layer, both of which are water based.

U.S. Pat. No. 4,988,563, issued to Wehr on Jan. 29, 1991, discloses a thermal transfer ribbon having a thermal sensitive coating and a protective coating. The protective coating is a wax-copolymer mixture which reduces ribbon offset.

U.S. Pat. Nos. 5,128,308 and 5,248,652, issued to Talvalkar, each disclose a thermal transfer ribbon having a reactive dye which generates color when exposed to heat from a thermal transfer printer.

And, U.S. Pat. No. 5,240,781, issued to Obatta et al., discloses an ink ribbon for thermal transfer printers having a thermal transfer layer comprising a wax-like substance as a main component and a thermoplastic binder adhesive layer having a film forming property.

As demonstrated by the above patents, the selection of thermal transfer ribbons and formulations is diverse as are their end uses.

Thermal transfer printing has been widely used in printing characters for magnetic ink character recognition (MICR). Representative documentation in this area includes U.S. Pat. No. 5,041,331, issued to Glavin et al. on Aug. 20, 1991. U.S. Pat. No. 5,041,331 describes a thermal transfer ribbon with a functional layer with from 10 to 30 parts by weight magnetic metal oxide so that the resulting print will provide the desired level of signal transmission for machine scanning. While thermal transfer formulations and ribbons for MICR printing are known, inorganic metal oxide magnets are used to provide the necessary signal transmission for machine scanning. These inorganic metal oxides place limitations on the ribbon formulations and printed material produced. For example, the print obtained will always be opaque since the inorganic metal oxides are opaque. It is desirable to provide thermal transfer formulations, thermal transfer ribbons and MICR recognizable images which are not dependent on the use of inorganic metal oxides as magnets.

It is also desirable to provide coating formulations, thermal transfer media and MICR recognizable images which utilize unique magnetic pigments.

Organic molecule-based magnets are unique and have been disclosed in "Designer Magnets", *Chemical & Engineering News*, pp. 30–41, Oct. 2, 1995. Saturation magnetization values for organic molecule-based magnets have been reported as high as 2½ times that of iron on a mole or metal-atom basis; however, the organic molecule-based magnets have a much lower density and higher molecular mass than iron. Therefore, the saturation magnetization of these materials on a mass or volume basis is far less than conventional magnets. Despite the lower saturation magnetization values, these compounds have received attention because their magnetic properties can be modulated by flexible organic syntheses and, because they are largely non-metallic, some have properties such as transparency and insulating behavior.

Examples include:

a) $[FeCp_2]^{\cdot+}[TCNE]^{\cdot-}$, where
Cp=pentamethylcyclopentadienide $(C_5(CH_3)_5)$
TCNE=tetracyanoethylene $(NC)_2C=C(CN)_2$ b) 4-nitrophenylnitronyl nitroxide c) 1,3,5,7-tetramethyl-2,6-diazaadamantane-N,N'-dioxyl d) $[FeCp_2]^{\cdot-4}[TCNE]^{\cdot-}$ e) $[FeCp_2]^{\cdot-4}[TCNQ]^{\cdot-}$ f) $[MnCp_2]^{-+}[TCNE]^-$ g) $[FeCp_2]^{-+}[TCNE]^-$ h) $[Mn^{III}TPP]^+[TCNE]^-$ i) $(CrCp_2)^{-+}[TCNE]^-$ TPP=meso-tetraphenyl porphyrin j) $V(TCNE)_2 \cdot \frac{1}{2}CH_2Cl_2$ (obtained by reacting $V(C_6H_6)_2$ or $V(CO)_6$ and TCNE.

SUMMARY OF THE INVENTION

It is an object of the present invention to provide a printed image from thermal printing that contains a magnet other than an inorganic magnet in an amount sufficient to be recognizable by MICR devices.

It is another object of the present invention to provide an image from thermal printing that can be recognized by MICR devices and is transparent and/or electrically insulating.

It is the further object of the present invention to provide a coating formulation which contains an organic molecule-based magnet in an amount sufficient to provide thermal transfer layers that form images from thermal transfer printing which are recognizable by MICR devices.

It is another object of the present invention to provide a thermal transfer medium with a thermal transfer layer that contains an organic molecule-based magnet in an amount sufficient to provide printed images from thermal transfer printing which are recognizable by MICR devices.

It is the further object of the present invention to provide a thermal printer used in combination with a thermal transfer ribbon which contains a magnet, other than metal oxide magnets, in an amount sufficient to provide images from thermal transfer printing that are recognizable by MICR devices.

These and other objects and advantages of the present invention will become apparent and further understood from the detailed description and claims which follow, together with the annexed drawings.

The above objects are achieved through the use of an organic molecule-based magnet to provide magnetically responsive species within the images, coating formulations, thermal transfer media and thermal printers of this invention.

There is provided by this invention a coating formulation which forms thermal transfer layers for thermal transfer media which transfer MICR recognizable images to a receiving substrate upon exposure to the print head of a thermal printer. This formulation comprises wax, binder resin, solvent and an organic molecule-based magnet in an amount sufficient to provide thermal transfer layers that form printed images recognizable by MICR devices upon exposure to the print head of a thermal printer.

The formulation preferably forms images which are transparent and the wax and binder resin are preferably sufficiently compatible such that the binder resin does not separate from the solution, dispersion or emulsion containing both the wax and binder resin. In addition, the wax and binder resin preferably have similar softening points so as to easily transfer from the flexible substrate to the synthetic receiving substrate upon exposure to a print head of a thermal transfer printer. The wax and binder resin can comprise a water dispersible or emulsifiable wax and a water soluble, dispersible or emulsifiable binder resin, respectively.

In another aspect of the present invention, there is provided a thermal transfer medium which transfers MICR readable images to a receiving substrate when exposed to the print head of a thermal printer. This thermal transfer medium comprises a flexible substrate with a thermal transfer layer positioned thereon, said thermal transfer layer comprising wax, binder resin, sometimes residual solvent, and a sensible material comprising an organic molecule-based magnet.

An additional aspect of this invention is a printed image which is recognizable by MICR devices obtained from thermal transfer printing, wherein said printed image comprises a layer in a pattern which is MICR readable positioned on a receiving substrate and said patterned layer comprises wax, binder resin and a sensible material which comprises an organic molecule-based magnet in an amount sufficient to be MICR readable. Preferably, the image is transparent and/or electrically insulating.

A further aspect of the present invention is a thermal printer used in combination with a thermal transfer ribbon with a thermal transfer layer which contains an organic molecule-based magnet in an amount sufficient to provide images that are recognizable by MICR.

DETAILED DESCRIPTION OF THE PREFERRED EMBODIMENTS

Figure 1:
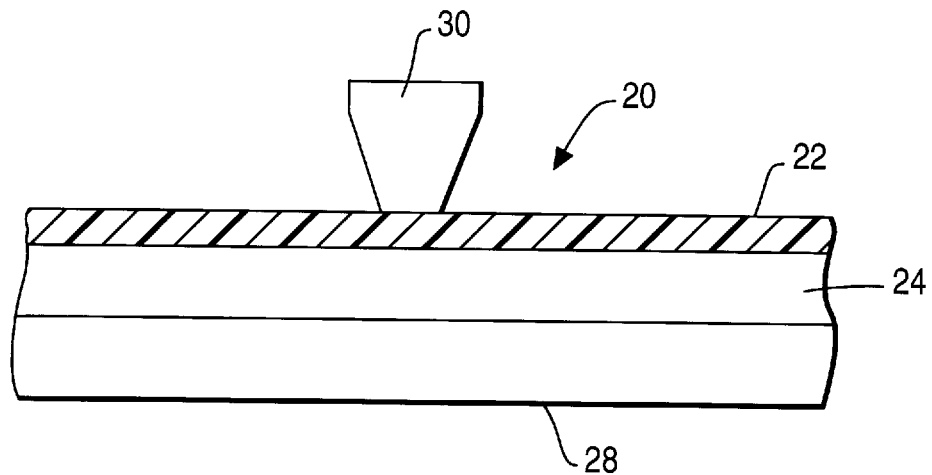
FIG. 1 illustrates a thermal transfer medium of the present invention in a printing operation prior to thermal transfer.

The coating formulation of this invention can comprise components employed in conventional coating formulations such as one or more waxes, binder resins, and solvents. However, the sensible material (pigment) employed is an organic molecule-based magnet which renders the printed images obtained therefrom recognizable by magnetic ink character recognition (MICR) devices. The coating formulation of this invention contains these magnets in a solution, dispersion or emulsion.

Suitable organic molecule magnets include those known in the art which contain no metal and those which contain some metal complexed with an organic portion. Suitable for use in this invention are those classified as ferromagnets, ferrimagnets and paramagnets.

Those without metal include 4-nitrophenyl nitronyinitroxide and 1,3,5,7-tetramethyl-2,6-diazadamantane, N,N'-dioxyl. Those which are complexed with metal include the ionic salts:

a) Fe di (pentamethylcyclopentadienide) tetracyanoethylene ($[FeCp_2]^{-+}[TCNE]^-$);

b) $FeCp_2]^{-+}[TCNE]^-$;

c) $[FeCp_2]^{-+}[\text{tetracyanoquinodimethane}]^-$;

d) $Mn^{III}[\text{mesotetraphenylporphyrin}]^+[TCNE]^-$;

e) $V(\text{tetracyanoethylene})_2 \cdot 1/2CH_2Cl_2$;

f) $[CrCp_2]^{-+}[TCNE]^-$;

g) $[MnCp_2]^{-+}(TCNE)^-$;

h) $[FeCp_2]^{-+}[TCNE]^-$ and others disclosed in "Designer Magnets", *Chem. Eng. News*, p. 30–41, Oct. 2, 1995. The preferred organic molecule-based magnets are transparent and/or insulating.

Many of the organic molecule-based magnets are known to be soluble in common solvents such as water with or without the aid of dispersing agents to facilitate dispersion of the magnets in the solution. Conventional anionic, cationic and non-ionic surfactants and dispersants are suitable.

Most preferably, a surfactant pair (surfactant and dispersant) are used, one anionic and one non-ionic.

These organic molecule-based magnets can be prepared by the conventional methods disclosed by Gatteshi, Dante, "Molecular Magnets: A Basis for New Material." *Adv. Mat.* 6(1994):635. Kinoshita, Minoru "Ferromagnetism in Organic Radical Crystals", Jap. J. Appl. Phys. 33 (1994) 5718; Iwamura et al., Editors, "Proceedings of the Conference on Chemistry & Physics of Molecular Based Magnetic Materials," *Mol. Cryst., Liq. Cryst.*, 232–233 (1993).

The organic molecule-based magnets can be added to the formulation in a manner consistent with conventional methods for introducing conventional magnetic pigments. However, alternative (non-conventional) methods for preparing the coating formulations of this invention may also be suitable, since grinding is generally not required.

The amount of organic molecule-based magnet is preferably such that it provides printed images with sufficient signal transmission to be recognizable by conventional MICR devices. The organic molecule-based magnet is typically employed in an amount higher than conventional magnets due to the lower saturization magnetization values per unit of mass. Suitable levels fall in the range of about 5 to 50 wt. %, most preferably about 10 to 40 wt. %, based on the weight of dry components. These organic molecule-based magnets exhibit higher solubility in the waxes and binder resins than inorganic magnets, allowing these higher loadings in the formulation.

The coating formulations of this invention contain wax as a main dry component which is preferably soluble, dispersible or emulsifiable in solvents for the organic molecule-based magnets. Such waxes can be natural waxes such as carnauba wax, candelilla wax, bees wax, rice bran wax; petroleum waxes such as paraffin wax; synthetic hydrocarbon waxes such as low molecular weight polyethylene and Fisher-Tropsch wax; higher fatty acids such as myristic acid, palmitic acid, stearic acid and behenic acid; higher aliphatic alcohols such as stearyl alcohol and esters such as sucrose fatty acid esters. Mixtures of waxes can also be used. Examples of preferred waxes are carnauba wax under the Slip-Ayd series of surface conditioners by Daniel Products Co. and low molecular weight polyethylene. The melting point of the wax falls within the range of from 75° C. to 250° C., preferably from 75° C. to 200° C. Waxes with melting points at the high end are advantageous in that they aid in the integrity of the printed image. The amount of wax used in the coating formulations of present invention is above 5 wt. % based on the dry ingredients, preferably 10 to 90 wt. %. The coating formulations typically comprise 20 to 55 wt. % total solids. This translates at least to 1 to 2 wt. % wax based on the total formulation. Preferred coating formulations have from 2–30 wt. % wax based on the total formulation. To aid in processing, rheology and compatibility with binder resin, micronized grades of wax are preferred.

The coating formulations of this invention also contain a binder resin which is preferably soluble, dispersible or emulsifiable in solvents for the organic molecule-based magnet. Suitable binder resins include thermoplastic resins. Suitable thermoplastic resins include those used in conventional coating formulations such as those described in U.S. Pat. No. 5,240,781 and 5,348,348 and the following: polyvinylchloride, polyvinyl acetate, vinyl chloride-vinyl acetate copolymers, polyethylene, polypropylene, polyacetal, ethylene-vinyl acetate copolymers, ethylene alkyl (meth)acrylate copolymers, ethylene-ethyl acetate copolymer, polystyrene, styrene copolymers, polyamide, ethylcellulose, epoxy resin, polyketone resin, terpene resin, petroleum resin, polyurethane resin, polyvinyl butyryl, styrene-butadiene rubber, nitrile rubber, acrylic rubber, ethylene-propylene rubber, ethylene alkyl (meth)acrylate copolymer, styrene-alkyl (meth)acrylate copolymer, acrylic acid-ethylene-vinyl acetate terpolymer, saturated polyesters and sucrose benzoate. Suitable saturated polyesters are further described in U.S. Pat. No. 4,983,446. Preferred thermoplastic binder resins include sucrose benzoate, polyethylene, polyketone resins and styrene copolymers. The binder resin is preferably ground to submicron size to aid solubilization, dispersion or emulsification.

Preferred coating formulations may contain two or more resins to provide specific property profiles. For example, Piccotex resins by Hercules are hydrocarbon resins (vinyl toluene-alpha methyl styrene copolymers) that provide high hot tack properties which aid adhesion of the coating to the synthetic resin receiving substrate upon transfer. Polyethylene SL 300, a polyethylene resin emulsion of a small (submicron) particle size is a surface conditioner within the Slip-Ayd series by Daniel Products which provides slip or wax-like properties for transfer. These binder resins can be used together or with other resins to provide a specific property profile.

In addition to special properties such as these, the binder resin provides a higher melting point than the wax so that the image resulting therefrom exhibits high smear and scratch resistance. The binder resin has a melting/softening point of less than 300° C. and preferably in the range of 100° C. to 250° C. To provide high scratch and smear resistant images on synthetic resin substrates, the binder resin may comprise at least 25 wt. %, based on total dry ingredients, of the coating formulation. In preferred embodiments, the binder resin comprises 2 wt. % to 75 wt. % of the total dry ingredients. This translates to preferred coating formulations having at least 5 wt. % to 10 wt. % binder resin based on the weight of the total formulation, and preferred formulations having from 7 wt. % to 35 wt. % binder resin, based on the weight of the total formulation.

The binder resin is preferably compatible with the wax such that it does not separate out in dispersions or emulsions which contain 2 to 25 wt. % wax, based on the total weight of said dispersion or emulsion. Such compatibility ensures a high loading of binder resin for producing images with high scratch and smear resistance. To enhance compatibility, i.e., minimize separation, it is preferable for the binder resin and wax particles in emulsions and dispersions to be of submicron size particles.

The coating formulation of the present invention may contain another sensible material (pigment) to be used in addition to the organic molecule-based magnet which is capable of being sensed visually, by optical means, by magnetic means, by electroconductive means or by photoelectric means. This additional sensible material is typically a coloring agent such as a dye or pigment but may include magnetic particles to supplement the organic molecule-based magnet. Any coloring agent used in conventional ink ribbons is suitable, including carbon black and a variety of organic and inorganic coloring pigments and dyes. Examples include phthalocyanine dyes, fluorescent naphthalimide dyes and others such as cadmium, primrose, chrome yellow, ultra marine blue, iron oxide, cobalt oxide, nickel oxide, etc. The total amount of sensible material, including the organic molecule-based magnet, is typically from about 5 to 60 parts by weight of the total dry ingredients for the coating formulation. The additional pigment can form 1 to 20 wt. %, preferably 5 to 15 wt. % of the total dry ingredients.

The coating formulation may contain plasticizers, such as those described in U.S. Pat. No. 3,663,278, to aid in processing of the thermal transfer layer. Suitable plasticizers are adipic acid esters, phthalic acid esters, ricinoleic acid esters sebasic acid esters, succinic acid esters, chlorinated diphenyls, citrates, epoxides, glycerols, glycols, hydrocarbons, chlorinated hydrocarbons, phosphates, and the like. The plasticizer provides low temperature sensitivity and flexibility to the thermal transfer layer so as not to flake off the substrate.

The coating formulation may contain other conventional additives for thermal transfer media including flexibilizers such as oil, weatherability improvers such a UV light absorbers, and fillers. The coating may further contain surfactants and dispersants which aid dispersion of the magnets.

The coating formulations of this invention contain the above identified solids in a solution, dispersion or emulsion of either an aqueous or organic solvent. The coating formulation is preferably water-based or water-rich; however, included in this invention are coating formulations wherein water is a minor portion of the total solvent or is absent. The organic solvents used are preferably miscible with water and include alkanols such as propanol. Small amounts of such organic solvents significantly enhance the stability and dispersion of these solids in aqueous formulations. Other suitable solvents include selected esters, ketones and ethers. The solids content of the coating formulation is typically within the range of 15 to 80 wt. % and more typically within the range of 20–55 wt. %. The solids content can be higher (up to 100%) where a hot melt formulation is used.

Preferred coating formulations comprise 10 to 90 wt. % wax, 40 to 75 wt. % binder resin and 10 to 40 wt. % organic molecule-based magnets based on the total weight of dry ingredients. A particularly preferred formulation is that containing a mixture of wax, an ethyl vinyl acetate copolymer binder resin and an organic molecule-based magnet as the sensible material.

The coating formulation of the present invention can be prepared in conventional equipment, such as an attritor or ball mill, or in an impeller equipped vessel, since the formulation need not be ground. The ingredients need only be combined as dispersions and mixed uniformly. The dispersions are typically about 30 wt. % solids. The wax is typically added first and the remaining components are added with minor heating. The preferred method is to mix the solvent, wax components and binder resin at an elevated temperature, preferably about 150° F., for about 15 minutes, after which the organic molecule-based magnet is added and the resulting mixture is mixed at an elevated temperature, preferably from about 140° F. to 150° F., for about two hours.

The thermal transfer medium of the present invention comprises a substrate, preferably a thin smooth paper or plastic-like material and a thermal transfer layer comprised of wax, binder resin, sometimes residual solvent and organic molecule-based magnet. Suitable waxes, binder resins and organic molecule-based magnet are as described above. Suitable substrate materials include tissue type paper materials such as 30–40 gauge capacitor tissue, manufactured by Glatz and polyester-type plastic materials such as 14–35 gauge polyester film manufactured by Dupont under the trademark Mylar®. Polyethylene naphthalate films, polyamide films such as nylon, polyolefin films such as polypropylene film, cellulose films such as triacetate film and polycarbonate films are also suitable. The substrates should have high tensile strength to provide ease in handling and coating and preferably provide these properties at minimum thickness and low heat resistance to prolong the life of heating elements within thermal print heads. The thickness is preferably 3 to 10 $\mu$m. If desired, the substrate or base film may be provided with a backcoating on the surface opposite the thermal transfer layer.

The thermal transfer layer is preferably obtained from the coating formulation of the present invention in the form of either a solution, dispersion or emulsion. The thermal transfer layer may contain all the additives and components suitable for the coating formulations described above. The presence of residual solvent is dependant on the effectiveness of drying step in forming the thermal transfer layer. Once applied to the substrate, a portion of the solvent can remain in the coating. The residual solvent is typically undesirable but it may aid in transferring the image.

The thermal transfer layer (functional layer) preferably has a softening point within the range of about 50° C. to 250° C. which enables transfer at normal print head energies which are believed to range from about 50° C. to 250° C.

The thermal transfer layers can be prepared by conventional techniques and equipment such as a Meyer Rod or like wire round doctor bar set up on a conventional coating machine to provide the coating weights described below. The coating weight of the thermal transfer layer typically ranges from 1.9 to 4.3 g/m$^2$. A temperature of about 160° F. is maintained during the entire coating process. After the coating formulation is applied, it is optionally passed through a dryer at an elevated temperature to ensure drying and adherence of the functional layer to the substrate. The thermal transfer layer can be fully transferred onto a receiving substrate such as paper or synthetic resin at a temperature in the range of 75° C. to 250° C.

The thermal transfer media of the present invention provides the advantages of thermal printing while providing printed images which are recognizable by MICR devices. When the thermal transfer media (ribbon) is exposed to the heating elements of the thermal print head, the thermal transfer layer softens and transfers from the medium (ribbon) to the receiving substrate with the magnets therein.

Figure 2:
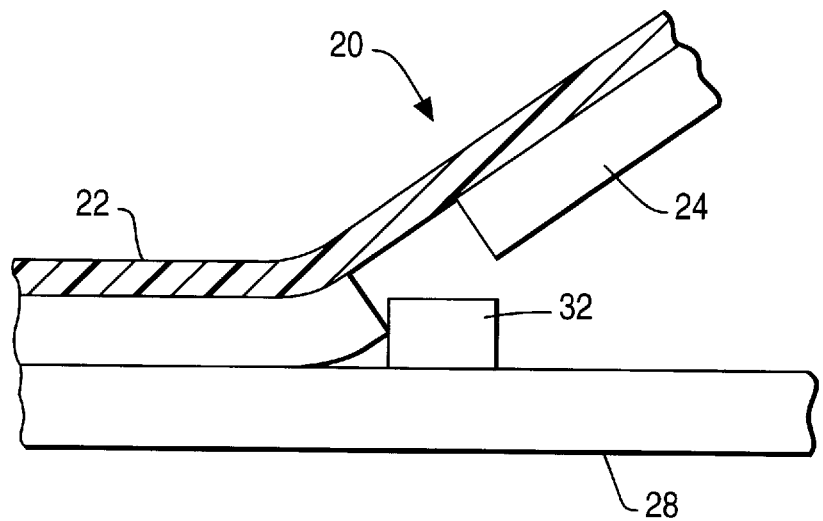
FIG. 2 illustrates a thermal transfer medium of the present invention in a printing operation after thermal transfer.

Illustrated in FIGS. 1–2, is a preferred thermal transfer ribbon 20, of this invention, which comprises substrate 22 of a flexible material which is preferably polyethylene terephthalate.

Positioned on substrate 22 is thermal transfer layer 24. The thermal sensitivity of thermal transfer layer 24 is determined by the softening point of the binder resin and wax. This thermal transfer layer has a softening point below 300° C., preferably below 250° C. and most preferably from 50° C. to 200° C. Softening temperatures within this range enable the thermal transfer medium to be used in conventional thermal transfer printers, which typically have print heads which operate at temperatures in the range of 50° C. to 250° C., more typically, temperatures in the range of 100° C. to 150° C. The thermal transfer layer preferably contains a wax and binder resin which are compatible so that exposure to heat from the print head uniformly transfers thermal transfer layer 24 from substrate 22 to synthetic resin receiving substrate 28 and form printed image 32.

Preferred thermal transfer media contain thermal transfer layers which comprise 10 to 95 wt. % wax, 40 to 75 wt. % binder resin and 15 to 40 wt. % organic molecule-based magnets based on the total weight of dry ingredients.

There is provided by this invention thermal transfer printers which employ the thermal transfer media of this invention. All hardware and software for the equipment can be conventional except for the thermal transfer media of this invention employed within the printer.

The printed images of this invention are preferably derived from thermal transfer media of this invention following transfer by a thermal transfer printer. These printed images comprise a single layer of the wax, binder resin and magnets as described above in the amounts described above for the coating formulations and thermal transfer media of this invention. This layer is derived from a thermal transfer layer of a thermal transfer medium following exposure to a print head of a thermal printer. The printed images of this invention are recognizable by MICR devices and preferably are transparent and/or electrically insulating. These printed images can be patterned to the fine detail which is necessary for MICR recognition of alpha-numeric characters and bar codes.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

The entire disclosure of all applications, patents and publications, cited above and below, are hereby incorporated by reference.

EXAMPLES

Example 1

A coating formulation of the present invention can be prepared by adding the following ingredients in Table 1 to a quart sized vessel equipped with an impeller and mixed for about 20 minutes.

The organic molecule-based magnet comprises V(TCNE)$_2 1/2 CH_2Cl_2$ dispersed within mineral spirits.

TABLE 1

| INGREDIENT | PERCENT DRY | WET AMOUNT | PREFERRED RANGE (% Dry) |
|---|---|---|---|
| Binder Resin (EC-1052 Latex @ 40%) | 20.0 | 50.0 | 15–40 |
| Wax (Carnauba Emulsion @ 25%) | 2.0 | 8.0 | 2–10 |
| Sensible Material (Organic Molecule-based Magnet @ 40%) | 10.0 | 12.5 | 10–40 |
| Wax-Resin (Polyethylene Emulsion @ 40%) | 12.0 | 30.0 | 10–40 |
| Mineral Spirits | — | 155.5 | |
| Binder resin (Sucrose Benzoate @ 25% in NPA) | 56.0 | 244.0 | 40–70 |
| Total | 100.0 | 500.0 | Final Solids 20% |

Preparation of a Thermal Transfer Ribbon and Image

The formulation of Example 1 can be coated on 18 gauge polyester film at about a 1.9–4.3 g/m² coat weight and dried at 160° F. to obtain a thermal transfer ribbon of the present invention. This ribbon is well suited for printing bar codes at a temperature in the range of 260°–300° F. using a TEC B-30 thermal transfer printer at +2V setting.

The preceding example can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A coating formulation which provides thermal transfer layers for thermal transfer media which soften or melt and transfer images to a receiving substrate when exposed to the print head of a thermal transfer printer, wherein said images are recognizable by magnetic ink character recognition devices (MICR), wherein said coating formulation comprises 10 to about 80 wt. % wax, based on total dry components, 2 to 75 wt. % thermoplastic polymer resin, based on total dry components, a water rich or water-based carrier liquid and a sensible material comprising an organic molecule-based magnet in an amount of 10–40 wt. % based on total dry components sufficient to render the printed images therefrom recognizable by MICR devices wherein said coating formulation comprises 20–55 wt. % solids and the thermoplastic polymer resin and wax are a) of submicron size and b) dispersed or emulsified in the water-rich or water-based carrier liquid of the coating formulation.

2. A coating formulation as in claim 1 which additionally contains another sensible material other than an organic molecule-based magnet.

3. A coating formulation as in claim 1 which additionally contains an organic solvent, one or more surfactants or one or more dispersants to prevent agglomeration of the magnet.

4. A coating formulation as in claim 1 which additionally contains a colored pigment in the amount of 5 to 15 wt. % based on total dry components of said formulation.

5. A coating formulation as in claim 1, wherein the wax has a melting point in the range of 40° C. to 130° C.; and the binder resin is a thermoplastic polymer resin having a melting/softening point in the range of 100° to 250° C.

* * * * *

UNITED STATES PATENT AND TRADEMARK OFFICE
CERTIFICATE OF CORRECTION

PATENT NO.    : 5,866,637
DATED         : February 2, 1999
INVENTOR(S)   : Michael A. Lorenz It is certified that error appears in the above-identified patent and that said Letters Patent is hereby corrected as shown below:

Column 10,
Line 24, delete "about".

Signed and Sealed this

Twenty-first Day of August, 2001

*Attest:*

*Nicholas P. Godici*

*Attesting Officer*

NICHOLAS P. GODICI
*Acting Director of the United States Patent and Trademark Office*